United States Patent

Ihara et al.

Patent Number: 5,999,289
Date of Patent: Dec. 7, 1999

[54] DETECTION OF, AND COMPENSATION FOR, WAVEFORM CHANGE DUE TO CHROMATIC DISPERSION

[75] Inventors: Takeshi Ihara, Kawasaki; Yoichi Oikawa, Sapporo, both of Japan

[73] Assignee: Fujitsu Limited, Kawasaki, Japan

[21] Appl. No.: 09/035,852

[22] Filed: Mar. 6, 1998

[30] Foreign Application Priority Data

Oct. 20, 1997 [JP] Japan .................................. 9-286980

[51] Int. Cl.[6] ............................ H04J 14/02; G01N 21/00
[52] U.S. Cl. ......................... 359/124; 359/125; 356/73.1
[58] Field of Search ................................... 359/124, 125, 359/173, 153, 179; 356/73.1

[56] References Cited

U.S. PATENT DOCUMENTS

| | | | |
|---|---|---|---|
| 5,406,368 | 4/1995 | Horiuchi et al. | 356/73.1 |
| 5,870,184 | 2/1999 | Furuhasi | 356/73.1 |
| 5,877,881 | 3/1999 | Miyauchi et al. | 359/161 |
| 5,880,824 | 3/1999 | Uchiyama et al. | 356/73.1 |

*Primary Examiner*—Frank G. Font
*Assistant Examiner*—Layla Lauchman
*Attorney, Agent, or Firm*—Staas & Halsey LLP

[57] ABSTRACT

Waveform degradation due to chromatic dispersion of an optical fiber is detected and compensated for. A waveform detector detects a change in waveform, based on the ratio between the powers of a plurality of frequency components or on peak or duty detection, and the frequency bandwidth of an equalizing amplifier or the chromatic dispersion of an optical fiber is controlled based on the result of the detection.

12 Claims, 9 Drawing Sheets

DETECTION OF, AND COMPENSATION FOR, WAVEFORM CHANGE DUE TO CHROMATIC DISPERSION

BACKGROUND OF THE INVENTION

1. Field of the Invention

The present invention relates to a method and apparatus for detecting waveform degradation due to chromatic dispersion of an optical fiber in an optical transmission system, and also relates to a method and apparatus for compensating for such waveform degradation.

2. Description of the Related Art

In optical transmission systems, as transmission speeds increase, waveform degradation due to chromatic dispersion of optical fibers becomes a practical concern, and techniques for compensating for such waveform degradation become necessary. In the prior art, a compensating technique has been known that involves inserting a dispersion-compensating fiber having a dispersion value opposite in sign to the dispersion value of a transmission line.

This prior art technique has had the following problems.

The effect of optical fiber dispersion changes depending on temperature, transmission distance, characteristics of the fiber installed, etc., but, since practical systems do not have means for detecting the degree of dispersion-induced waveform degradation during system operation, it is difficult with the prior art to make optimum settings individually according to the system characteristics while the system is in service.

Dispersion-compensating fiber has such shortcomings as high cost, large size, and high insertion loss.

Further, controlling the frequency bandwidth of an equalizing amplifier circuit in an optical receiver in order to compensate for waveform degradation creates the following problems.

In ultra-high speed regions of about 10 Gb/s, electronic circuits must be implemented as integrated circuits, but resistors and capacitors capable of being varied over a wide range are difficult to implement on an IC.

Increasing the operating bandwidth is difficult because of the bandwidth limiting by the bandwidth control circuit itself.

SUMMARY OF THE INVENTION

Accordingly, it is a first object of the present invention to provide a method and apparatus for detecting a waveform change caused by optical fiber chromatic dispersion.

It is a second object of the present invention to provide a method and apparatus for compensating for the detected waveform change.

According to the present invention, there is provided a method of detecting a signal waveform change caused by chromatic dispersion of an optical transmission line, comprising the steps of: converting an optical signal, received via the optical transmission line, into an electrical signal; detecting signal powers of the electrical signal at a plurality of frequencies including a frequency substantially sensitive to the effect of the chromatic dispersion of the optical transmission line and a frequency substantially insensitive to the effect of the chromatic dispersion of the optical transmission line; and detecting the signal waveform change caused by the chromatic dispersion of the optical transmission line on the basis of the ratio between the signal powers at the plurality of frequencies.

According to the present invention, there is also provided a method of detecting a signal waveform change caused by chromatic dispersion of an optical transmission line, comprising the steps of: converting an optical signal, received via the optical transmission line, into an electrical signal; detecting a mean value, a high level peak value, and a low level peak value of the electrical signal; and detecting a signal waveform change by comparing the mean value with a mean value taken between the high level peak value and the low level peak value.

According to the present invention, there is also provided a method of detecting a signal waveform change caused by chromatic dispersion of an optical transmission line, comprising the steps of: converting an optical signal, received via the optical transmission line, into an electrical signal; and detecting a signal waveform change by detecting signal duty of the electrical signal.

According to the present invention, there is also provided a method of compensating for a signal waveform change caused by chromatic dispersion of an optical transmission line, comprising the steps of: converting an optical signal, received via the optical transmission line, into an electrical signal; detecting the signal waveform change in the electrical signal caused by the chromatic dispersion of the optical transmission line; and compensating for the signal waveform change by equalizing and amplifying the electrical signal through an equalizing amplifier circuit whose frequency characteristic is controlled in accordance with the detected waveform change.

According to the present invention, there is also provided a method of compensating for a signal waveform change caused by chromatic dispersion of an optical transmission line, comprising the steps of: converting an optical signal, received via the optical transmission line, into an electrical signal; detecting signal powers of the electrical signal at a plurality of frequencies including a frequency substantially sensitive to the effect of the chromatic dispersion of the optical transmission line and a frequency substantially insensitive to the effect of the chromatic dispersion of the optical transmission line; detecting the signal waveform change caused by the chromatic dispersion of the optical transmission line on the basis of the ratio between the signal powers at the plurality of frequencies; and compensating for the signal waveform change by controlling the chromatic dispersion of the optical transmission line in accordance with the detected waveform change.

According to the present invention, there is also provided a method of compensating for a signal waveform change caused by chromatic dispersion of an optical transmission line, comprising the steps of: converting an optical signal, received via the optical transmission line, into an electrical signal; detecting a mean value, a high level peak value, and a low level peak value of the electrical signal; detecting a signal waveform change by comparing the mean value with a mean value taken between the high level peak value and the low level peak value; and compensating for the signal waveform change by controlling the chromatic dispersion of the optical transmission line in accordance with the detected waveform change.

According to the present invention, there is also provided a method of compensating for a signal waveform change caused by chromatic dispersion of an optical transmission line, comprising the steps of: converting an optical signal, received via the optical transmission line, into an electrical signal; detecting a signal waveform change by detecting signal duty of the electrical signal; and compensating for the signal waveform change by controlling the chromatic dispersion of the optical transmission line in accordance with the detected waveform change.

According to the present invention, there is also provided an apparatus for detecting a signal waveform change caused by chromatic dispersion of an optical transmission line, comprising: a photodetector for converting an optical signal, received via the optical transmission line, into an electrical signal; power detection means for detecting signal powers of the electrical signal at a plurality of frequencies including a frequency substantially sensitive to the effect of the chromatic dispersion of the optical transmission line and a frequency substantially insensitive to the effect of the chromatic dispersion of the optical transmission line; and a waveform change detection circuit for detecting the signal waveform change caused by the chromatic dispersion of the optical transmission line on the basis of the ratio between the signal powers at the plurality of frequencies.

According to the present invention, there is also provided an apparatus for detecting a signal waveform change caused by chromatic dispersion of an optical transmission line, comprising: a photodetector for converting an optical signal, received via the optical transmission line, into an electrical signal; a detection circuit for detecting a mean value, a high level peak value, and a low level peak value of the electrical signal; and a comparison circuit for detecting a signal waveform change by comparing the mean value with a mean value taken between the high level peak value and the low level peak value.

According to the present invention, there is also provided an apparatus for detecting a signal waveform change caused by chromatic dispersion of an optical transmission line, comprising: a photodetector for converting an optical signal, received via the optical transmission line, into an electrical signal; and a duty detection circuit for detecting a signal waveform change by detecting signal duty of the electrical signal.

According to the present invention, there is also provided an apparatus for compensating for a signal waveform change caused by chromatic dispersion of an optical transmission line, comprising: a photodetector for converting an optical signal, received via the optical transmission line, into an electrical signal; waveform change detection means for detecting the signal waveform change in the electrical signal caused by the chromatic dispersion of the optical transmission line; and an equalizing amplifier circuit, whose frequency characteristic is controlled in accordance with the detected waveform change, for compensating for the signal waveform change by equalizing and amplifying the electrical signal.

According to the present invention, there is also provided an apparatus for compensating for a signal waveform change caused by chromatic dispersion of an optical transmission line, comprising: a photodetector for converting an optical signal, received via the optical transmission line, into an electrical signal; power detection means for detecting signal powers of the electrical signal at a plurality of frequencies including a frequency substantially sensitive to the effect of the chromatic dispersion of the optical transmission line and a frequency substantially insensitive to the effect of the chromatic dispersion of the optical transmission line; a waveform change detection circuit for detecting the signal waveform change caused by the chromatic dispersion of the optical transmission line on the basis of the ratio between the signal powers at the plurality of frequencies; and chromatic dispersion control means for compensating for the signal waveform change by controlling the chromatic dispersion of the optical transmission line in accordance with the detected waveform change.

According to the present invention, there is also provided an apparatus for detecting a signal waveform change caused by chromatic dispersion of an optical transmission line, comprising: a photodetector for converting an optical signal, received via the optical transmission line, into an electrical signal; a detection circuit for detecting a mean value, a high level peak value, and a low level peak value of the electrical signal; a comparison circuit for detecting a signal waveform change by comparing the mean value with a mean value taken between the high level peak value and the low level peak value; and chromatic dispersion control means for compensating for the signal waveform change by controlling the chromatic dispersion of the optical transmission line in accordance with the detected waveform change.

According to the present invention, there is also provided an apparatus for compensating for a signal waveform change caused by chromatic dispersion of an optical transmission line, comprising: a photodetector for converting an optical signal, received via the optical transmission line, into an electrical signal; a duty detection circuit for detecting a signal waveform change by detecting signal duty of the electrical signal; and chromatic dispersion control means for compensating for the signal waveform change by controlling the chromatic dispersion of the optical transmission line in accordance with the detected waveform change.

DESCRIPTION OF THE PREFERRED EMBODIMENTS

Figure 1:
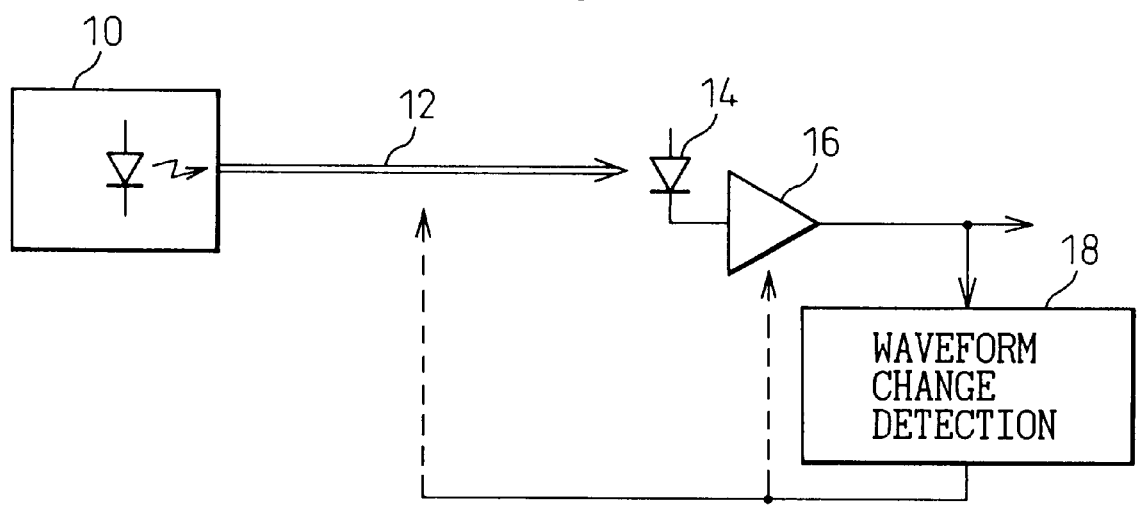
FIG. 1 is a diagram showing the basic configuration of the present invention.

FIG. 1 shows the basic configuration of an apparatus, according to the present invention, for detecting a waveform change caused by chromatic dispersion, and for compensating for the waveform change thus detected. In FIG. 1, an optical signal received from an optical transmitter 10 through an optical fiber 12 is converted by a photodetector 14 into an electrical signal, and equalized and amplified by an equalizing amplifier circuit 16.

A waveform change detector 18 detects a waveform change caused by chromatic dispersion, as described in detail below, and compensates for the waveform change by controlling either the frequency characteristic of the equalizing amplifier 16 or the amount of chromatic dispersion of the optical fiber 12 in accordance with the result of the detection.

Figure 2:
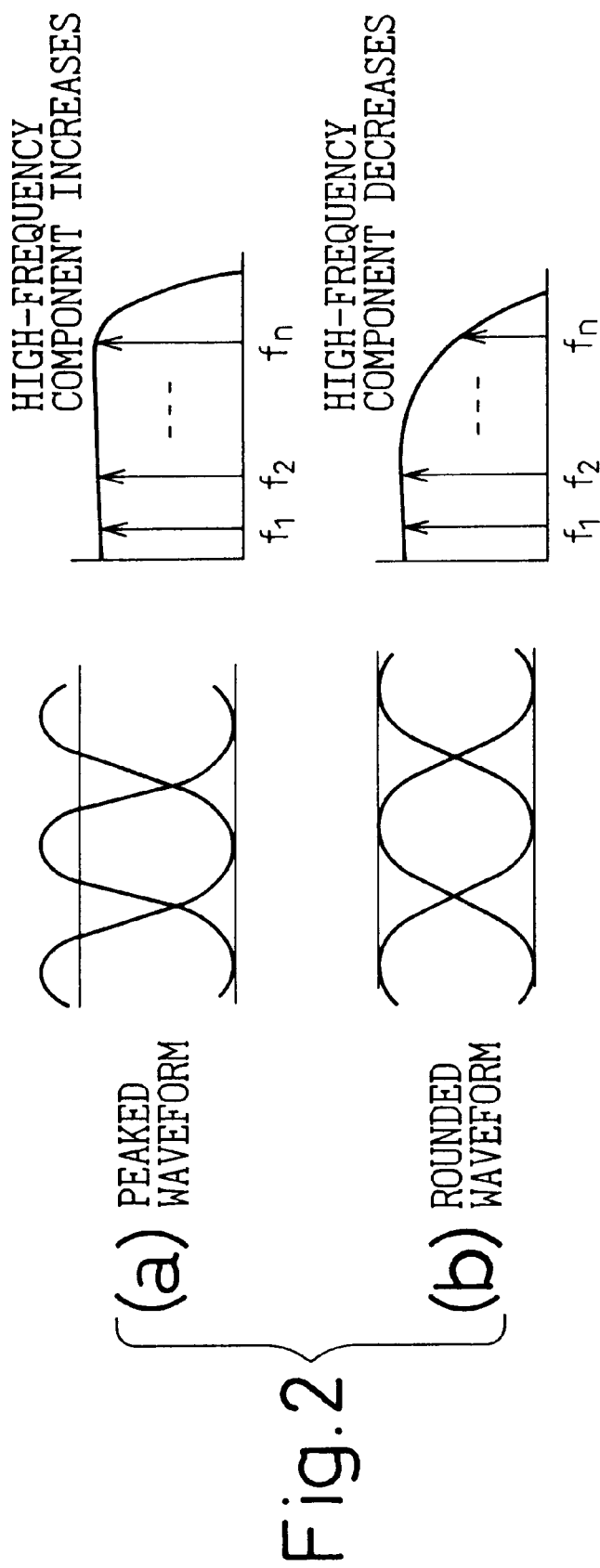
FIG. 2 is a diagram for explaining the relationship between a waveform change due to optical fiber chromatic dispersion and a frequency component ratio.

As shown in FIG. 2, a change occurs in the received waveform because of chromatic dispersion of an optical fiber, with the characteristic that when the waveform becomes a peaked waveform due to pulse compression, the higher frequency component increases (part (a)), and when the waveform becomes rounded due to pulse spreading, the higher frequency component decreases (part (b)). By detecting the power of the higher frequency component, the change in the waveform can be detected. At this time, the powers of at least two frequency components, a low-frequency component insensitive to the effect of chromatic dispersion and a high-frequency component sensitive to that effect, should be detected and the ratio between them should be calculated so that the waveform change can be distinguished from the change in the input optical power itself.

Figure 3:
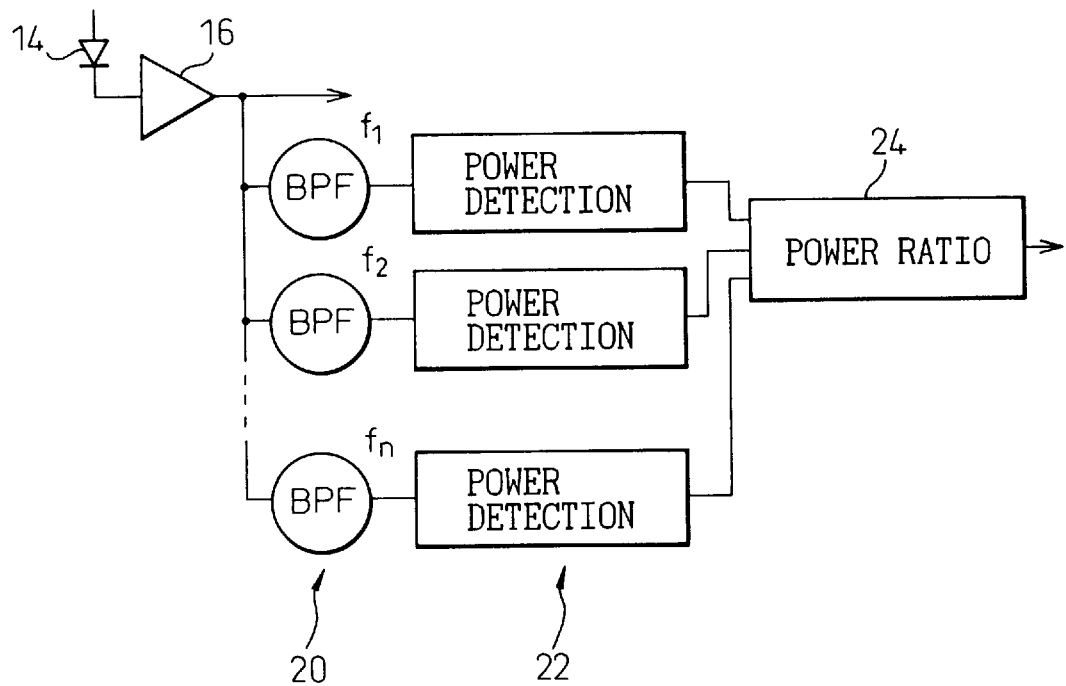
FIG. 3 is a diagram showing a first example of an apparatus for detecting a waveform change on the basis of the frequency component ratio, according to a first embodiment of the present invention.

In a first embodiment concerning the waveform change detection in the waveform change detector 18, the powers of the above-mentioned at least two frequency components are detected and the ratio between them is calculated. The low-frequency component insensitive to the effect of chromatic dispersion refers to the frequencies lower than 1 GHz, for example, when the bit rate is 40 GHz, and the high-frequency component sensitive to it refers to the frequencies between 30 GHz to 40 GHz. FIG. 3 shows one example of the waveform change detection apparatus according to the first embodiment of the present invention. The output of the equalizing amplifier circuit 16 is supplied in parallel to the inputs of a plurality of band-pass filters 20 whose pass band center frequencies are $f_1, f_2, \ldots f_n$, respectively; then, the powers of their outputs are detected by respective power detectors 22, and the ratio between them is calculated by a power ratio calculator 24.

Figure 4:
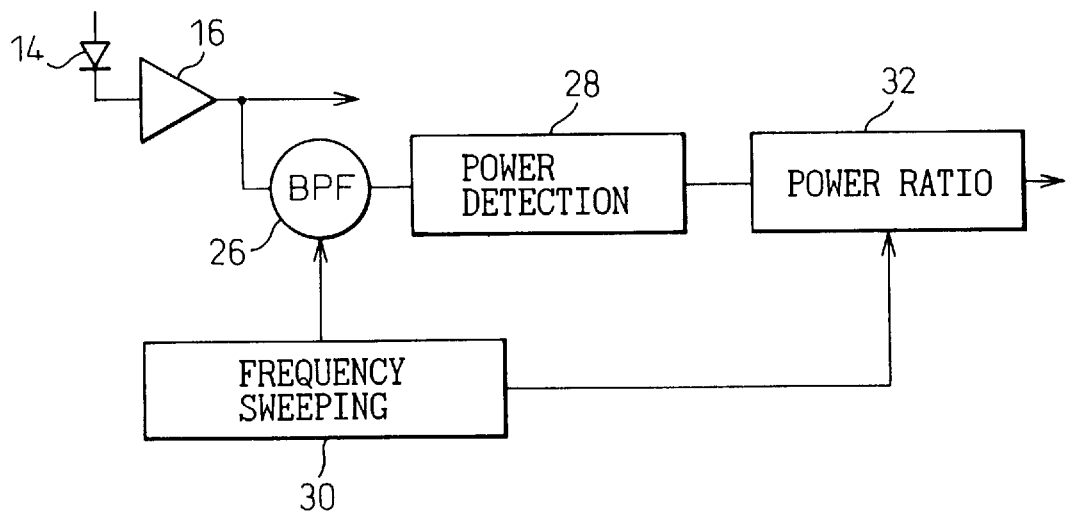
FIG. 4 is a diagram showing a second example of the detection based on the frequency component ratio.

FIG. 4 shows a second example of the waveform change detection apparatus according to the first embodiment of the present invention. The output of the equalizing amplifier circuit 16 is supplied as an input to a band-pass filter 26 whose pass band center frequency is variable, and whose output power is detected by a power detector 28. The center frequency of the band-pass filter 26 is swept by a frequency sweeper 30, and from the output of the power detector 28 representing powers detected at a plurality of frequencies, a power ratio calculator 32 calculates the power ratio between the plurality of frequency components.

Figure 5:
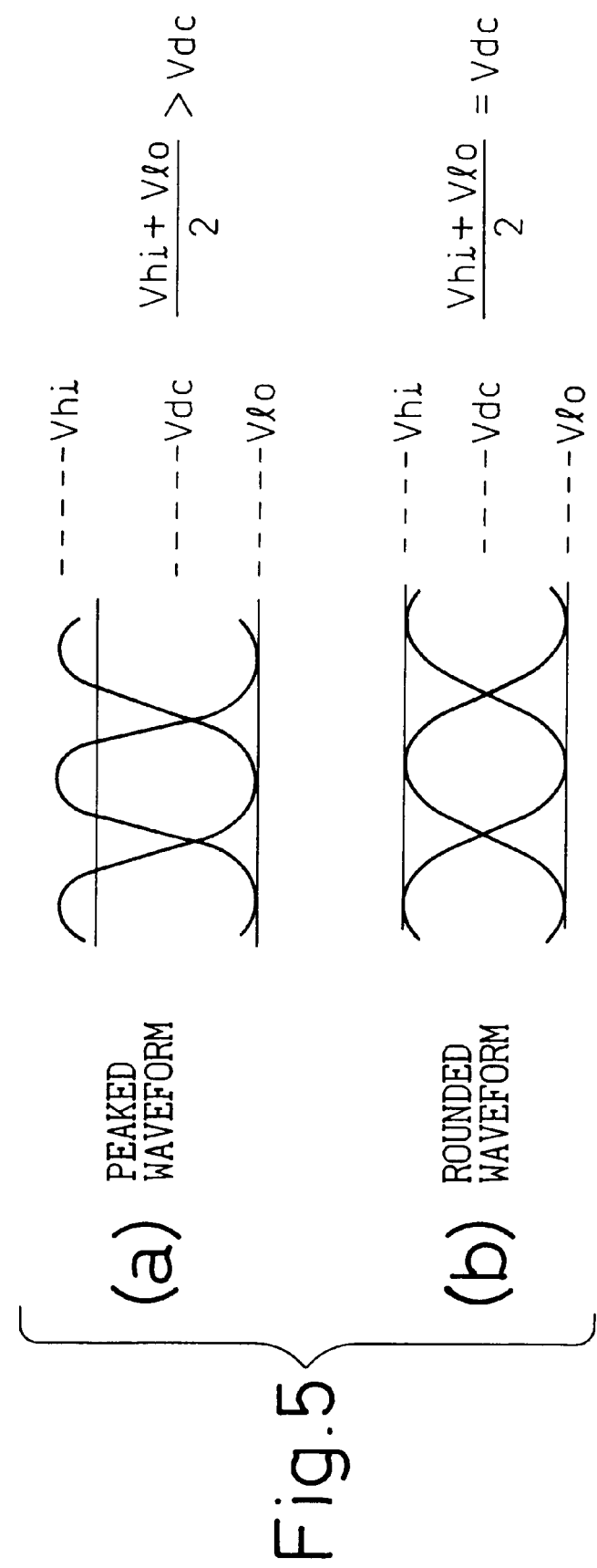
FIG. 5 is a diagram for explaining the relationship between a waveform change and peak values.

As shown in FIG. 5, when pulse compression occurs due to fiber dispersion, the waveform has the characteristic of exhibiting prominent upper peaks. Accordingly, when a high level peak value and a low level peak value of the waveform are detected, and their mean value is compared with the DC mean value of the waveform, the change of the waveform can be determined from the result of the comparison between the two values.

Figure 6:
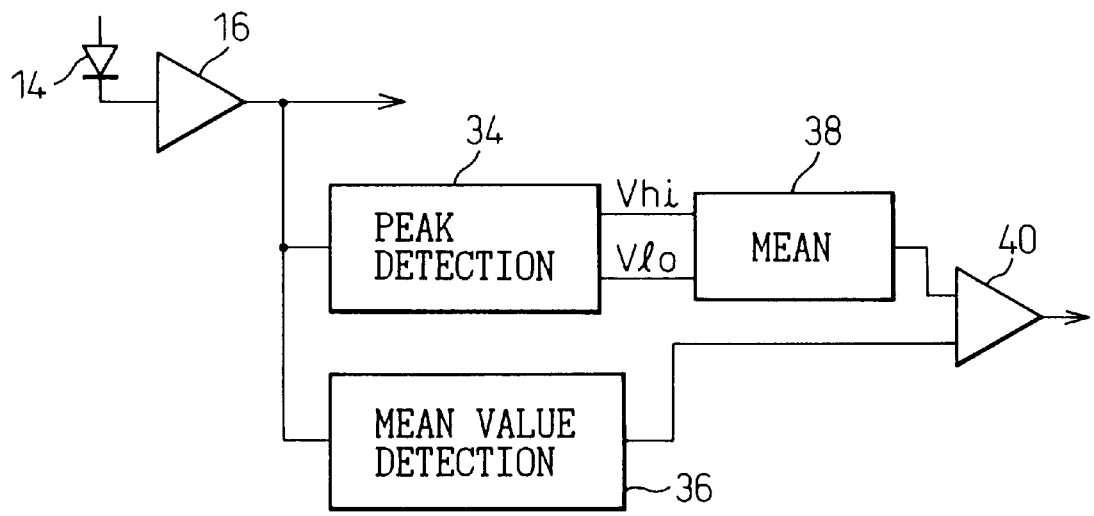
FIG. 6 is a diagram showing an apparatus for detecting a waveform change off the basis of the peak values, according to a second embodiment of the present invention.

FIG. 6 shows a waveform change detection apparatus according to a second embodiment of the present invention based on this idea. In FIG. 6, the output of the equalizing amplifier 16 is supplied as inputs to a peak detector 34 and a mean value detector 36. From the high level peak value $V_{hi}$ and low level peak value $V_{lo}$ detected by the peak detector 34, their mean value $V_{hi}+V_{lo}/2$ is calculated by a mean calculator 38 and is compared by a comparator 40 with the output of the mean value detector 36.

Figure 7:
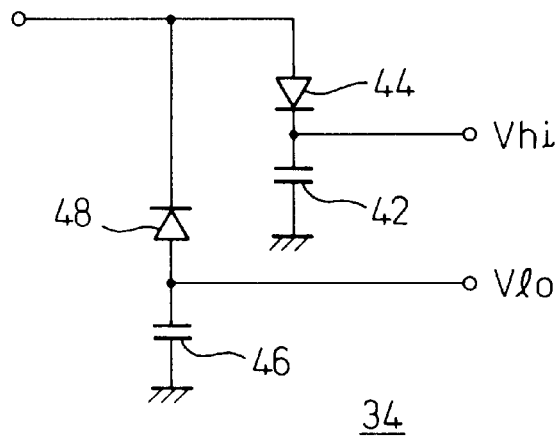
FIG. 7 is a circuit diagram showing details of the peak detector 34 in FIG. 6 by way of example.

FIG. 7 shows the details of the peak detector 34 by way of example. In FIG. 7, a capacitor 42 is charged to the high level peak voltage $V_{hi}$ of the input signal via a diode 44, and a capacitor 46 is charged to the low level peak voltage $V_{lo}$ of the input signal via a diode directed in the opposite direction to that of the diode 44. The mean value detector 36 in FIG. 6 is implemented by a low-pass filter.

As can be seen from FIG. 5, when pulse compression occurs due to dispersion, the duty ratio of the waveform decreases, and when pulse spreading occurs, the duty ratio increases. Accordingly, the change in the waveform due to dispersion can be determined by detecting the duty ratio of the waveform.

Figure 8:
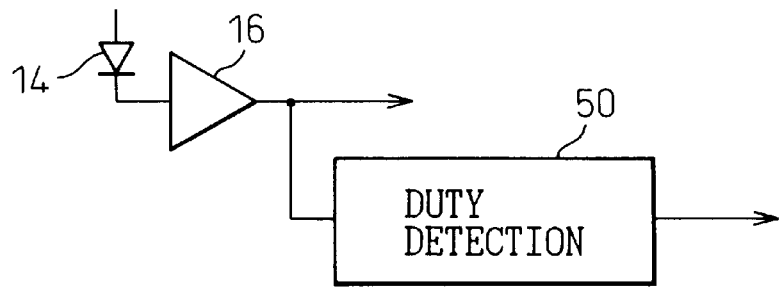
FIG. 8 is a diagram showing an apparatus for detecting a waveform change on the basis of duty detection, according to a third embodiment of the present invention.

FIG. 8 shows a waveform change detection apparatus according to a third embodiment of the present invention based on this idea. A duty detector 50 detects the change in the waveform due to optical fiber dispersion by detecting the duty of the signal output from the equalizing amplifier 16.

Figure 9:
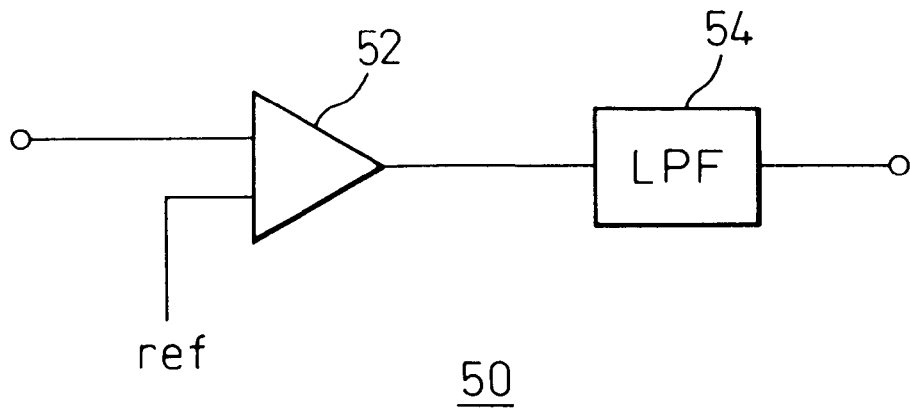
FIG. 9 is a circuit diagram showing the details of a duty detector 50 by way of example.

FIG. 9 shows the details of the duty detector 50 by way of example. A comparator 52 compares the input signal with a reference signal, and outputs a high level signal if the input signal is larger than the reference signal and a low level signal if the former is smaller than the latter. The DC component which a low-pass filter 54 detects from the output of the comparator 52 indicates the duration of the high level period, that is, the duty of the input signal.

As previously explained with reference to FIG. 2, waveforms have the characteristic that when pulse compression occurs due to fiber dispersion, the high-frequency component of the waveform increases, and when pulse spreading occurs, the high-frequency component decreases. Therefore, waveform compensation can be achieved by decreasing the bandwidth of the equalizing amplifier circuit 16 in the former case and increasing it in the latter case.

Figure 10:
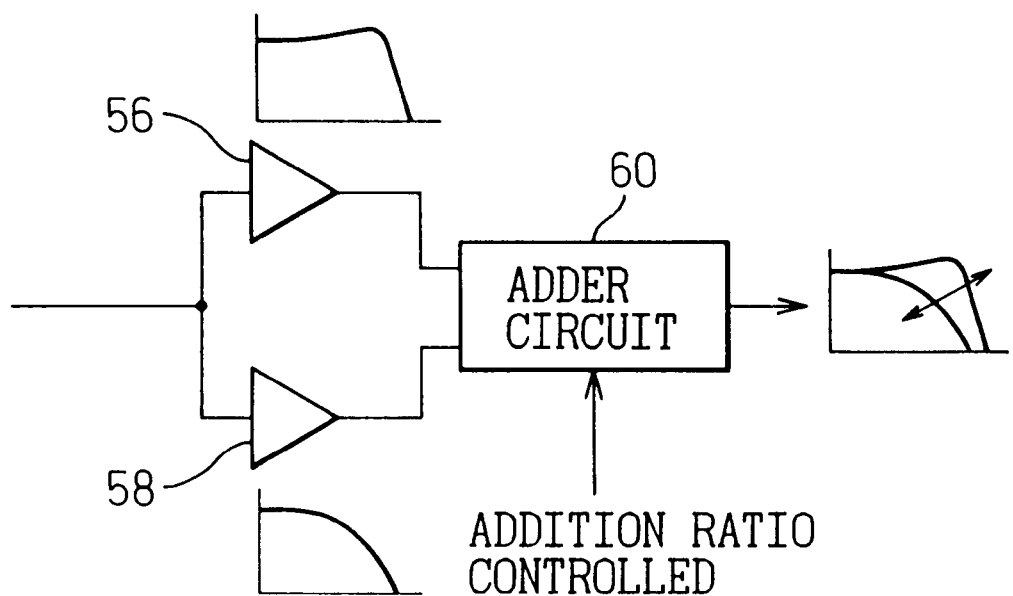
FIG. 10 is a diagram showing an equalizing amplifier circuit according to a fourth embodiment of the present invention.

Among methods of controlling the frequency bandwidth of the equalizing amplifier circuit, the previously described method that directly controls the circuit bandwidth is difficult to implement using an IC. An IC implementation is made possible by the configuration shown in FIG. 10; that is, a wideband high-peaking circuit 56 and a narrowband circuit 58 are provided, and output signals of the two circuits are added together by an adder circuit 60. By making the addition ratio variable, it becomes possible to control the entire bandwidth.

Figure 11:
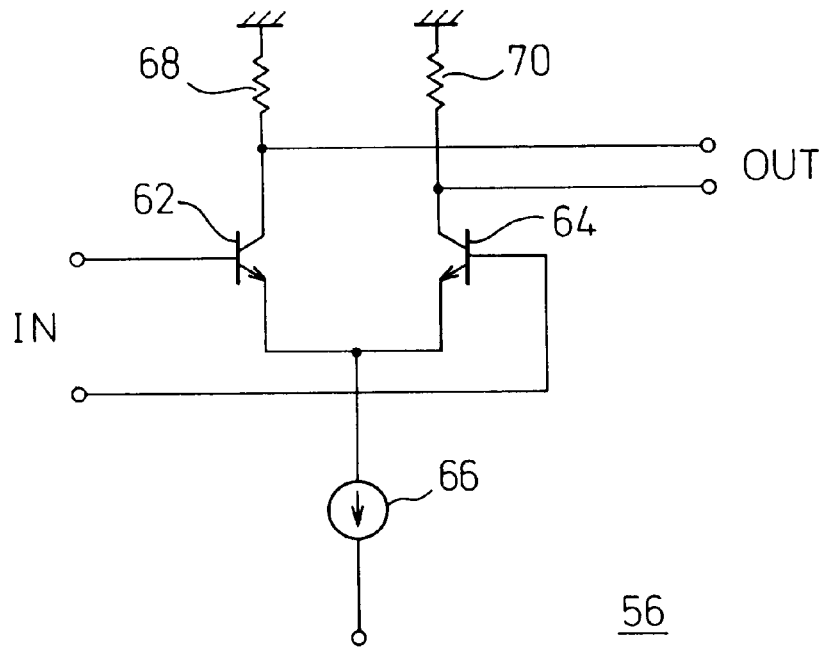
FIG. 11 is a circuit diagram showing the details of a wideband amplifier circuit 56 in FIG. 10 by way of example.

FIG. 11 shows the detailed configuration of the wideband amplifier circuit 56 by way of example.

Figure 12:
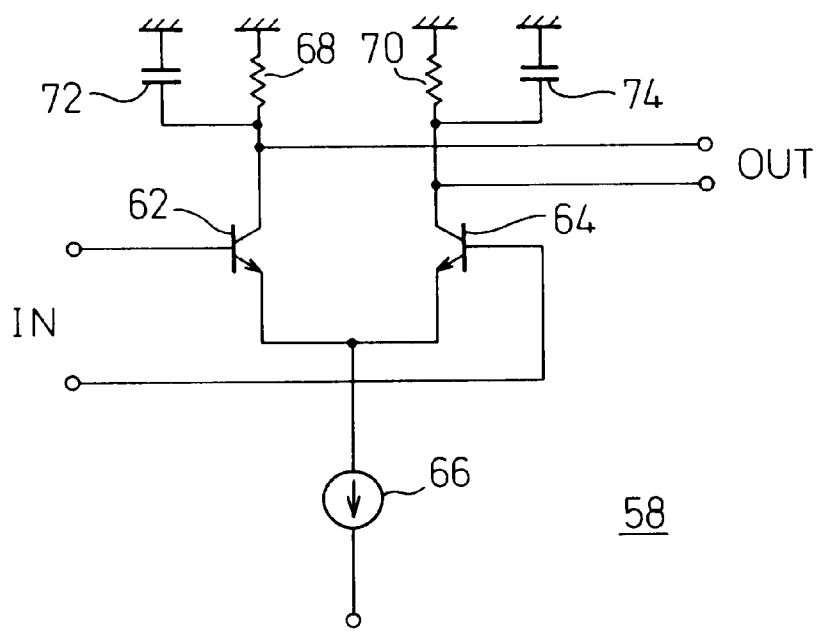
FIG. 12 is a circuit diagram showing the details of a narrowband amplifier circuit 58 in FIG. 10 by way of example.

Transistors 62, 64, a constant current source 66, and resistors 68, 70 together constitute a differential amplifier circuit. The time constant of this amplifier circuit is largely determined by the base-collector parasitic capacitances of the transistors 62 and 64 and the resistance values of the resistors 68 and 70. By contrast, in the narrowband amplifier circuit 58 shown in FIG. 12, capacitors 72 and 74 are added in parallel to the resistors 68 and 70, respectively, thus increasing the time constant.

Figure 13:
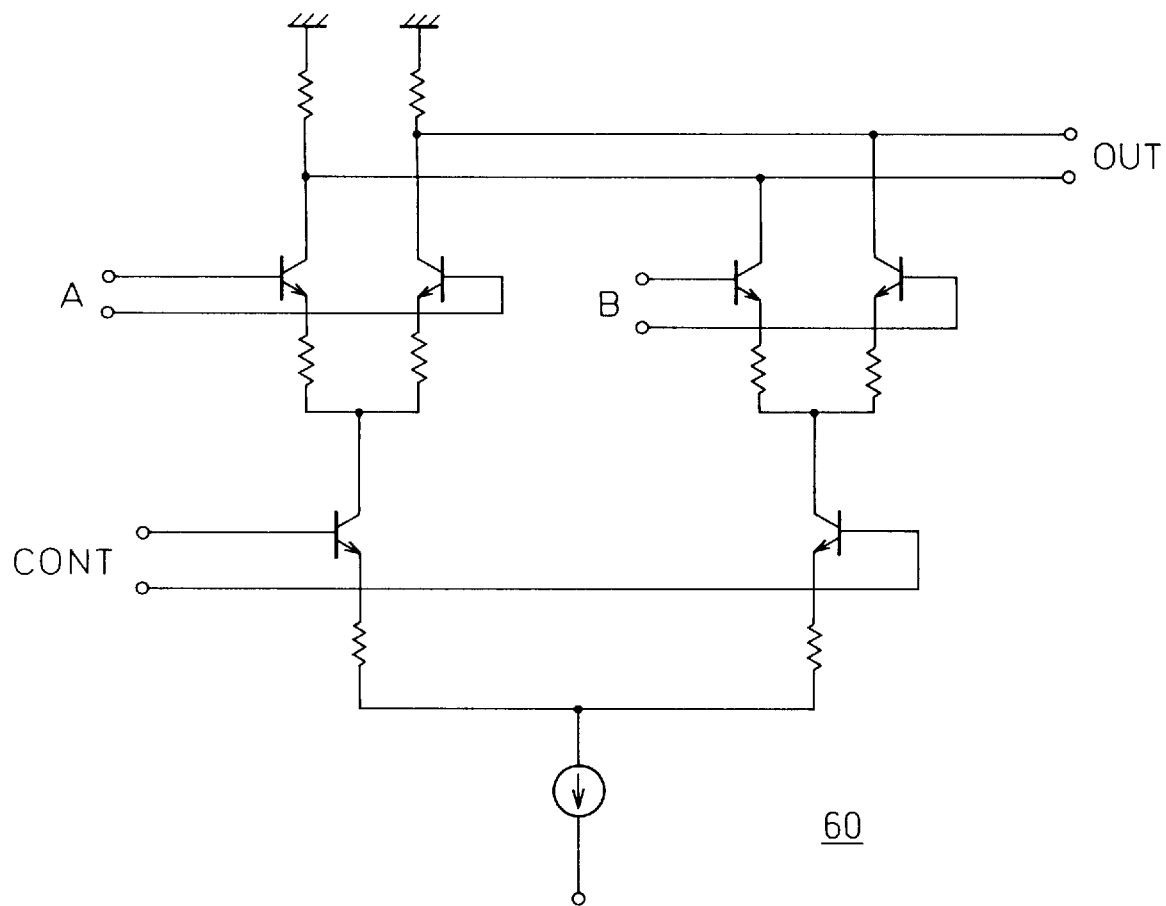
FIG. 13 is a circuit diagram showing the details of an adder circuit 60 in FIG. 10 by way of example.

FIG. 13 shows the detailed configuration of the adder circuit 60 by way of example. Voltages applied to inputs A and B are added together for output, with the addition ratio determined in accordance with the voltage applied to an input CONT.

Figure 14:
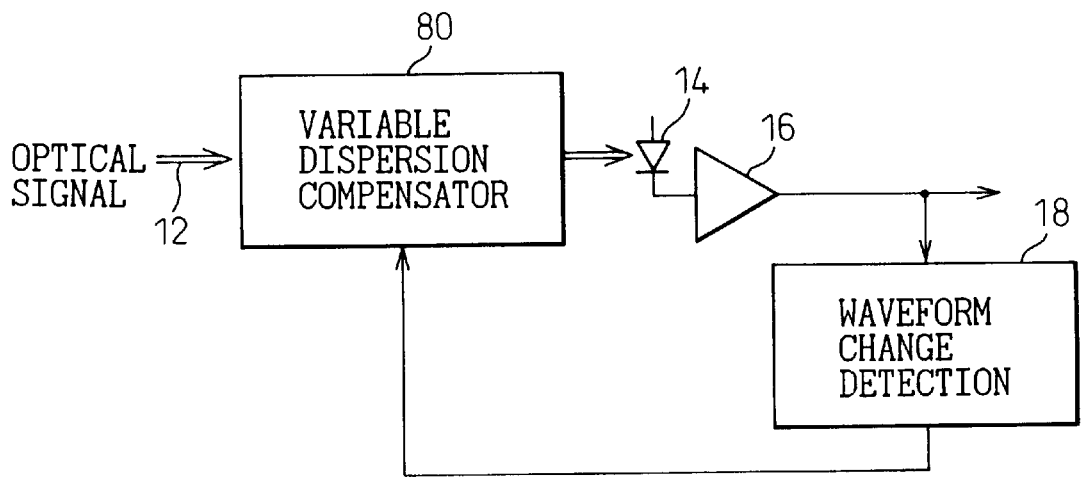
FIG. 14 is a diagram showing a system combining a waveform change detector 18 according to the present invention with a variable dispersion compensator 80.
Figure 15:
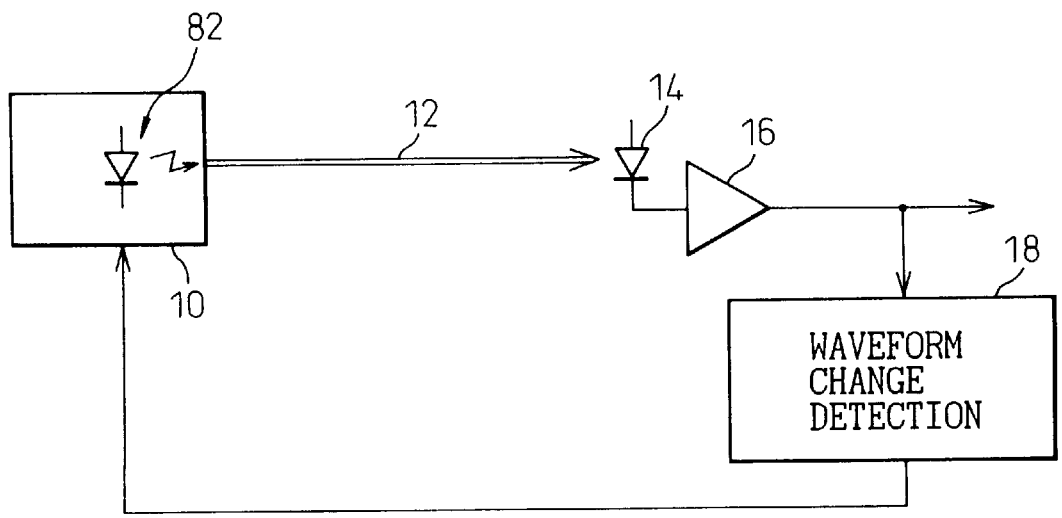
FIG. 15 is a diagram showing a system combining the waveform change detector 18 according to the present invention with dispersion control using a variable wavelength light source 82.

The detection and compensation methods so far described can all be implemented using electronic circuits and, by combining these methods, it becomes possible to automatically detect and compensate for waveform degradation due to fiber chromatic dispersion at relatively low cost. Furthermore, automatic compensation can also be implemented by combining the detection by the waveform change detector 18 of the present invention with the dispersion compensation by a prior known variable dispersion compensator 80 or with dispersion control that involves controlling the wavelength of signal light using a variable wavelength light source 82, as shown in FIGS. 14 or 15.

We claim:

1. A method of detecting a signal waveform change caused by chromatic dispersion of an optical transmission line, comprising the steps of:

(a) converting an optical signal, received via said optical transmission line, into an electrical signal;

(b) detecting signal powers of said electrical signal at a plurality of frequencies including a frequency substantially sensitive to the effect of the chromatic dispersion of said optical transmission line and a frequency substantially insensitive to the effect of the chromatic dispersion of said optical transmission line; and (c) detecting the signal waveform change caused by the chromatic dispersion of said optical transmission line on the basis of the ratio between the signal powers at said plurality of frequencies.

2. A method according to claim 1, wherein said step (b) includes the substeps of:

(i) inputting said electrical signal in parallel to a plurality of band-pass filters whose pass band center frequencies are respectively chosen equal to said plurality of frequencies; and (ii) detecting respective output powers of said plurality of band-pass filters.

3. A method according to claim 1, wherein said step (b) includes the substeps of:

(i) inputting said electrical signal to a band-pass filter whose pass band center frequency is variable;

(ii) detecting an output power of said band-pass filter; and (iii) sweeping the center frequency of said band-pass filter over a range including said plurality of frequencies.

4. A method of compensating for a signal waveform change caused by chromatic dispersion of an optical transmission line, comprising the steps of:

(a) converting an optical signal, received via said optical transmission line, into an electrical signal;

(b) detecting signal powers of said electrical signal at a plurality of frequencies including a frequency substantially sensitive to the effect of the chromatic dispersion of said optical transmission line and a frequency substantially insensitive to the effect of the chromatic dispersion of said optical transmission line;

(c) detecting the signal waveform change caused by the chromatic dispersion of said optical transmission line on the basis of the ratio between the signal powers at said plurality of frequencies; and (d) compensating for said signal waveform change by controlling the chromatic dispersion of said optical transmission line in accordance with said detected waveform change.

5. A method according to claim 4, wherein said step (b) includes the substeps of:

(i) inputting said electrical signal in parallel to a plurality of band-pass filters whose pass band center frequencies are respectively chosen equal to said plurality of frequencies; and (ii) detecting respective output powers of said plurality of band-pass filters.

6. A method according to claim 4, wherein said step (b) includes the substeps of:

(i) inputting said electrical signal to a band-pass filter whose pass band center frequency is variable;

(ii) detecting an output power of said band-pass filter; and (iii) sweeping the center frequency of said band-pass filter over a range including said plurality of frequencies.

7. An apparatus for detecting a signal waveform change caused by chromatic dispersion of an optical transmission line, comprising:

a photodetector for converting an optical signal, received via said optical transmission line, into an electrical signal;

power detection means for detecting signal powers of said electrical signal at a plurality of frequencies including a frequency substantially sensitive to the effect of the chromatic dispersion of said optical transmission line and a frequency substantially insensitive to the effect of the chromatic dispersion of said optical transmission line; and a waveform change detection circuit for detecting the signal waveform change caused by the chromatic dispersion of said optical transmission line on the basis of the ratio between the signal powers at said plurality of frequencies.

8. An apparatus according to claim 7, wherein said power detection means includes:

a plurality of band-pass filters whose pass band center frequencies are respectively chosen equal to said plurality of frequencies, and to which said electrical signal is input in parallel; and a plurality of power detectors for detecting respective output powers of said plurality of band-pass filters.

9. An apparatus according to claim 7, wherein said power detection means includes:

a band-pass filter whose pass band center frequency is variable, and to which said electrical signal is input;

a power detector for detecting an output power of said band-pass filter; and a frequency sweeping circuit for sweeping the center frequency of said band-pass filter over a range including said plurality of frequencies.

10. An apparatus for compensating for a signal waveform change caused by chromatic dispersion of an optical transmission line, comprising:

a photodetector for converting an optical signal, received via said optical transmission line, into an electrical signal;

power detection means for detecting signal powers of said electrical signal at a plurality of frequencies including a frequency substantially sensitive to the effect of the chromatic dispersion of said optical transmission line and a frequency substantially insensitive to the effect of the chromatic dispersion of said optical transmission line;

a waveform change detection circuit for detecting the signal waveform change caused by the chromatic dispersion of said optical transmission line on the basis of the ratio between the signal powers at said plurality of frequencies; and chromatic dispersion control means for compensating for said signal waveform change by controlling the chromatic dispersion of said optical transmission line in accordance with said detected waveform change.

11. An apparatus according to claim 10 wherein said power detection means includes:

a plurality of band-pass filters whose pass band center frequencies are respectively chosen equal to said plurality of frequencies, and to which said electrical signal is input; and a plurality of power detectors for detecting respective output powers of said plurality of band-pass filters.

12. An apparatus according to claim 10, wherein said power detection means includes:

a band-pass filter whose pass band center frequency is variable, and to which said electrical signal is input;

a power detector for detecting an output power of said band-pass filter; and a frequency sweeping circuit for sweeping the center frequency of said band-pass filter over a range including said plurality of frequencies.

* * * * *

UNITED STATES PATENT AND TRADEMARK OFFICE
CERTIFICATE OF CORRECTION

PATENT NO.: 5,999,289
DATED : December 7, 1999
INVENTOR(S): Takeshi IHARA et al.

It is certified that error appears in the above-identified patent and that said Letters Patent is hereby corrected as shown below:

Col. 7, line 37, change "the" (second occurrence) to --a--;
line 43, after "chosen" insert --to be--.

Col. 8, line 1, change "the" (second occurrence) to --a--;
line 12, after "chosen" insert --to be--;
line 42, change "the" (first occurrence) to --a--;
line 47, after "chosen" insert --to be--;
line 48, delete ",".

Col. 9, line 7, after "line;" insert --and--;

Col. 10, line 2, after "chosen" insert --to be--;
line 3, delete ",";
line 11, delete ",".

Signed and Sealed this

Seventeenth Day of October, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO. : 5,999,289
DATED : December 7, 1999
INVENTOR(S) : Takeshi Ihara, et al.

It is certified that error appears in the above-identified patent and that said Letters Patent is hereby corrected as shown below:

Col. 9, line 11, change "the" to --a--.

Signed and Sealed this

Sixth Day of March, 2001

Attest:

NICHOLAS P. GODICI

*Attesting Officer*   *Acting Director of the United States Patent and Trademark Office*